US006707657B1

(12) United States Patent
Powell

(10) Patent No.: US 6,707,657 B1
(45) Date of Patent: Mar. 16, 2004

(54) INTEGRATED ELECTRICALLY ACTUATED MECHANICAL RELEASE MECHANISM

(75) Inventor: Simon Powell, Royston (GB)

(73) Assignee: PBT (IP) Limited, Harlow (GB)

( * ) Notice: Subject to any disclaimer, the term of this patent is extended or adjusted under 35 U.S.C. 154(b) by 0 days.

(21) Appl. No.: 09/926,354

(22) PCT Filed: Apr. 19, 2000

(86) PCT No.: PCT/GB00/01511

§ 371 (c)(1),
(2), (4) Date: Mar. 22, 2002

(87) PCT Pub. No.: WO00/63939

PCT Pub. Date: Oct. 26, 2000

(30) Foreign Application Priority Data

Apr. 19, 1999 (GB) .......................................... 9908930
Apr. 21, 1999 (GB) .......................................... 9909173

(51) Int. Cl.[7] .......................................... H02H 3/08
(52) U.S. Cl. .......................................... 361/93.1
(58) Field of Search .......................... 361/93.1, 93.4, 361/93.7, 102; 307/126, 130, 131

(56) References Cited

U.S. PATENT DOCUMENTS 6,049,143 A * 4/2000 Simpson et al. ............ 307/126

FOREIGN PATENT DOCUMENTS

| | | |
|---|---|---|
| FR | 1 022 617 | 3/1953 |
| WO | WO 98/40917 | 9/1998 |

* cited by examiner

Primary Examiner—Adolf D. Berhane
(74) Attorney, Agent, or Firm—Oblon, Spivak, McClelland, Maier & Neustadt, P.C.

(57) ABSTRACT

An integrated electrically actuable mechanical release mechanism provides three separate fault detectors each arranged to detect a different current-driven fault in an electrical circuit. In a preferred embodiment a bimetallic strip is used to detect a low-current fault condition insufficient to trip a short-circuit detection mechanism, an active material bender is used to detect current imbalances between live and neutral lines, and a coil and armature are used to detect short circuits. The integrated mechanism has the advantage that electrical safety can be guaranteed across a range of electrical operating conditions.

21 Claims, 3 Drawing Sheets

INTEGRATED ELECTRICALLY ACTUATED MECHANICAL RELEASE MECHANISM

TECHNICAL FIELD

The present invention relates to an integrated electrically actuated mechanical release mechanism, and more particularly to such a mechanism when used as part of an electrical safety device such as a residual current circuit breaker.

BACKGROUND OF THE INVENTION

Various mechanisms are known in the art which provide electrical safety protection from a variety of potential electrical faults. Unfortunately each mechanism is usually designed to provide protection from a particular type of electrical fault. Various relevant types of electrical fault which may occur are, for example, a gross over-current condition such as may occur with a short circuit, an unbalanced fault current condition in the connections leading to and from the electrical supply, or a small fault current which, although insufficient to trip any short circuit protective mechanism, may still be damaging to sensitive electronic components in any device to which the safety mechanism is applied. Typically, a separate detection and actuation mechanism has previously been required for each type of fault, meaning that electrical safety could only be guaranteed within particular electrical regimes.

SUMMARY OF THE INVENTION

It is an object of the present invention to provide an integrated unitary electrically actuated release mechanism which integrates multiple level electrical protection into a single system.

In order to meet the above object, the present invention provides a integrated electrically actuable mechanical release mechanism comprising first fault detection means arranged to detect a first fault condition in an electric circuit; second fault detection means arranged to detect a second fault condition in the electrical circuit; third fault detection means arranged to detect a third fault condition in the electrical circuit; and means for breaking the electrical circuit in response to detection of any of the first, second or third fault conditions.

The first fault condition is preferably a low fault current condition which is insufficient to trip a short-circuit protection mechanism. The second fault current condition may preferably be a current imbalance between two or more parts of a circuit. The third fault current condition may preferably be a gross over-current condition such as those associated with a short-circuit condition.

In a preferred embodiment, the first fault detection means preferably comprises a bimetallic strip arranged to bend in response to the occurrence of the first fault condition in the circuit. Furthermore, the second fault detection means preferably includes an active material bender arranged to bend in response to the occurrence of the second fault condition. Moreover, in the preferred embodiment the third fault detection means preferably comprises a coil wound around a core, the core being ejected from within the coil on the occurrence of the third fault condition.

Preferably, the active material bender is a piezo active material bender as disclosed in our earlier international application no WO-A-98/40917, the relevant features of which necessary for a full understanding of the present invention being incorporated herein by reference.

The active material bender may by manufactured from a plurality of laminar members which are stacked one on top of the other to produce a low profile device.

A drive circuit is further provided for the active material bender which includes a toroidal transformer having primary and secondary coils arranged thereon adapted to detect current imbalances in two or more parts of the electrical circuit. The transformer is preferably further arranged to saturate at a level of current imbalance less that indicative of a second fault condition, the saturation of the core resulting in a high-voltage low-power output drive signal which can be used to drive the active material bender.

All of the detection means (the bimetallic member, the active material bender, and the coil) are preferably line independent, in that the energy of the fault current is used to actuate the detection means. Furthermore, all the faults to be detected are preferably current-driven.

The present invention has a primary advantage in that it provides an integrated unitary actuator which provides electrical protection from a variety of different electrical faults. Electrical safety can therefore be maintained over a wide range of electrical operating conditions.

BRIEF DESCRIPTION OF THE DRAWINGS

Further features and advantages of the present invention will become apparent from the following description of a preferred embodiment thereof, presented by way of example only, and by reference to the accompanying drawings in which.

DESCRIPTION OF THE PREFERRED EMBODIMENT

An embodiment of the integrated electrically actuated mechanical release mechanism of the present invention will now be described with reference to FIG. 1.

Figure 1:
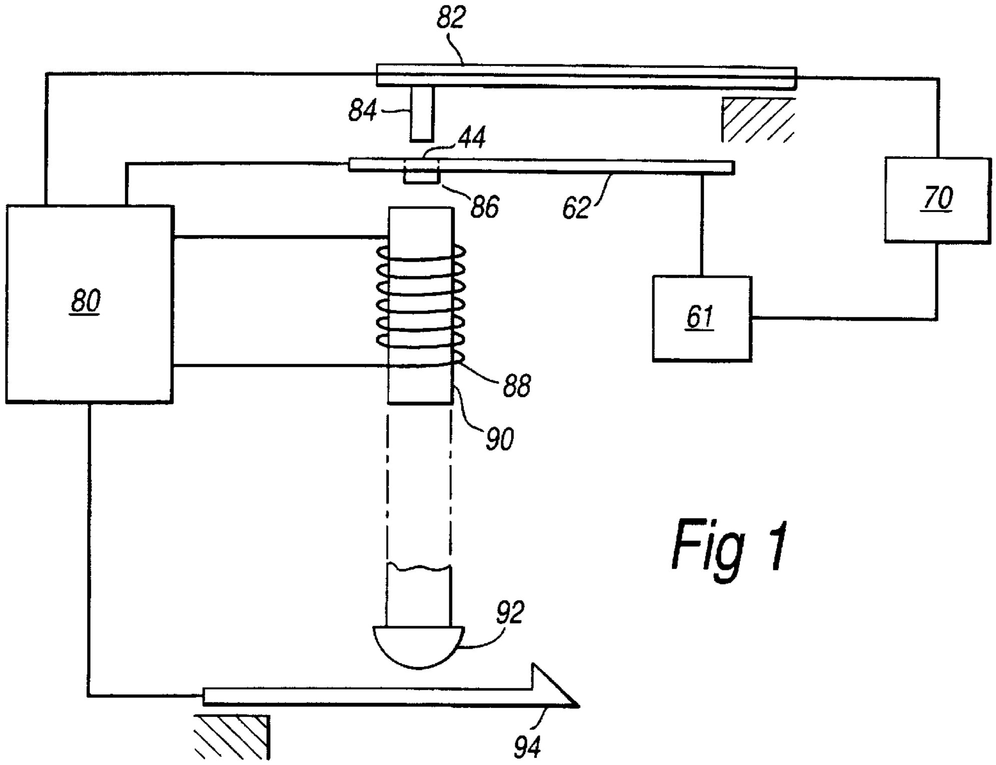
FIG. 1 shows a diagrammatic arrangement of the integrated mechanism of the present invention.

With reference to FIG. 1, an electrical contact 94 is arranged to receive electric current from a mains supply via associated electric contacts (not shown). The electrical contact 94 may be switched in and out of contact with the mains contacts as required. Various mechanisms and arrangements for achieving this are well known in the art.

The electric current from the electrical contact 94 is fed to a switching means 80 which contains appropriate switches and connections to feed the necessary electric current to each of the three detection means of the present invention.

A first detection means comprises a bimetallic strip 82 composed of at two or more laminated plates of different material, each material having a different expansion coefficient with respect to temperature. The strip 82 is secured at a first end, and provided with an actuator 84 arranged at the opposite end. Connections are provided from the switching means 80 to one end of the strip.

A second detection means comprises a piezo active material bender 62 composed of piezo-active materials such as piezo-ceramics. A feature of all active materials is that they are relatively inefficient, having coupling factors between the electrical driving means and the actual mechanical output of fractions of a percent. Consequently, actuators which use such materials require high drive fields. In order to provide such a high field, connections are provided between the bimetal strip 82 to a toroidal transformer 70, and from there to a voltage multiplier 61. The connections are such that the current flows through the bimetal strip before flowing to the transformer, and thence to the voltage multiplier. The toroidal transformer provides a high-voltage low power signal to the multiplier in a manner to be described later, and the voltage multiplier multiplies the transformed voltage and feeds it to one end of the active material bender 62 Further connections are then provided from the far end of the active material bender back to the switching means 80 to complete the circuit. The active material bender is further provided with an actuator 86 and a movable tip 44 which moves in response to the applied fields from the current, as described later.

A third fault detection means comprises a coil 88 arranged so as to be wrapped around a metal core 90. Connections are provided from each end of the coil to the switching means 80 to allow current to be fed to the coil. The operation of such a coil in detecting fault conditions is as follows. In the presence of a sudden short circuit, the sudden increase in current flow is accompanied by a sudden increase in magnetic flux around the wire in which the current is flowing. The increased magnetic flux when enhanced by virtue of the wire being wrapped into a coil acts upon the metal core 90 to eject the core from within the coil. The ejection need not be total but may easily be detected and used to actuate a tripping mechanism.

As part of a tripping mechanism to open the electrical contact 94 in the event of a fault being detected which relates to a short circuit, the present invention further provides a short circuit plunger 92. This is arranged to act in response to detection of a short circuit by the coil 88 and core 90, and may even form part of or be directly attached to the core 90, although this need not necessarily be the case. Whatever arrangement is used to fire the plunger, the operation of the plunger in breaking contact of the electrical contact 94 with the mains contacts must be as fast as possible, lest the high current in the event of a short circuit cause the electrical contact 94 to melt or fuse to the mains contacts.

In use, the arrangement of the present invention acts to detect multiple types of electrical fault. As already discussed above, the coil arrangement 88 is used to detect short circuits which cause a gross-over current condition, and which require a very fast response to prevent severe or irreparable damage. The bimetal strip is used to detect relatively small fault currents which are not of immediate danger. The piezo material bender in combination with the toroidal transformer is used to detect current imbalances which are indicative of a fault condition.

The bimetal strip relies on the heating effect of the current passing through the strip to cause differential expansion of each layer of the strip and hence cause the strip to bend, and hence has a relatively slow response. The actuator 84 presses upon the piezo material 62 in the event of the bimetallic strip bending due to a fault current, and causes the piezo material to flex. This flexing may be detected mechanically through the arrangement of the piezo material as described later, or electrically through the current generated by the flexing piezo. Whichever mechanism is used, the detected flexing is used to trip the tripping mechanism to cause the electrical contact 94 to be opened.

Figure 3:
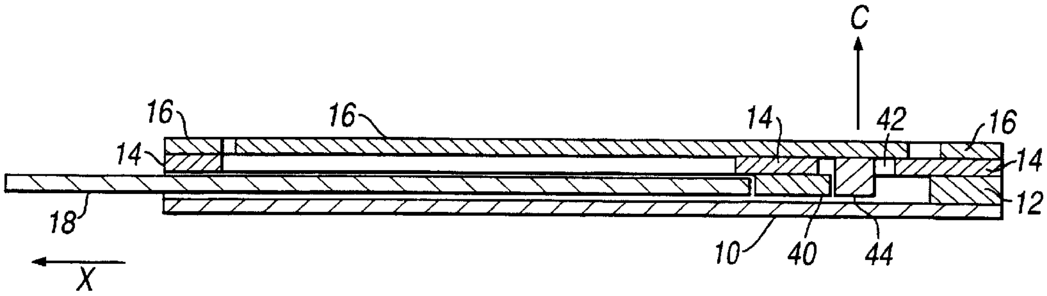
FIG. 3 shows a cross-section of the preferred construction of the active material bender mechanism along the line A—A of FIG. 2 and looking in the direction of the arrows.
Figure 2:
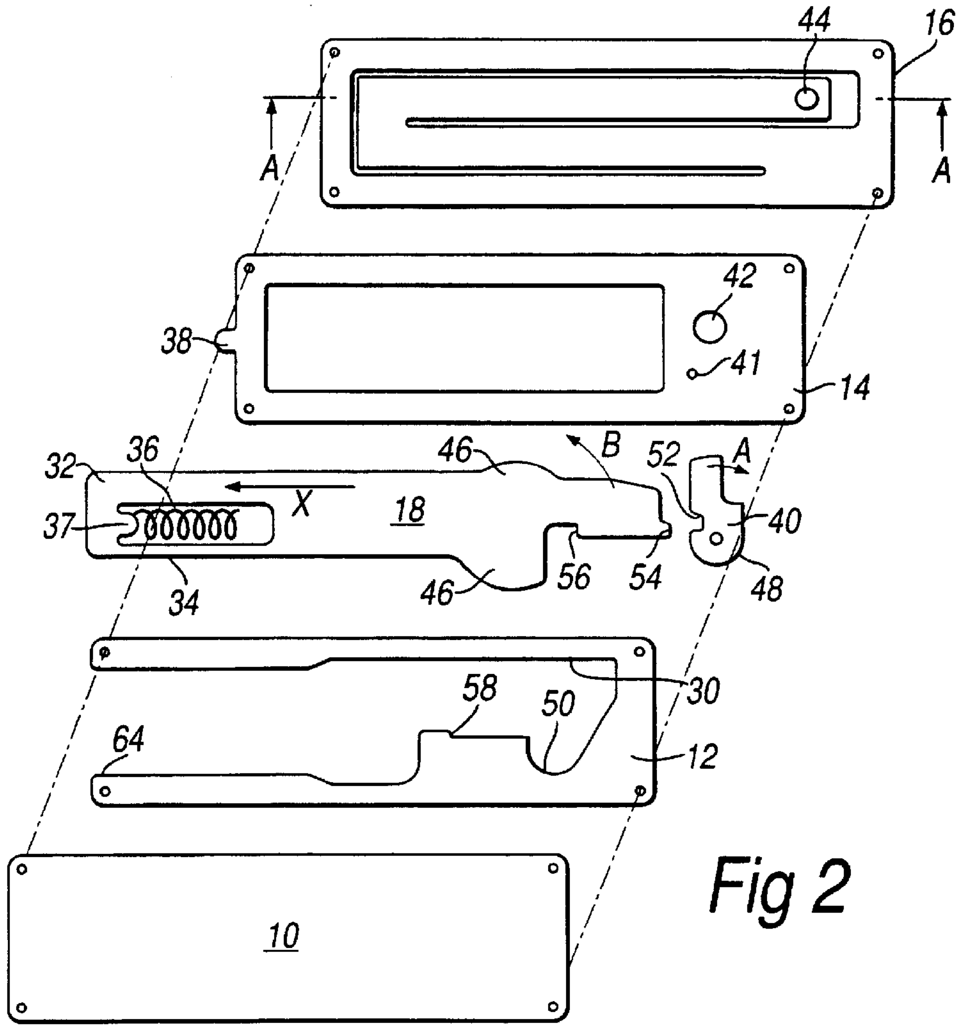
FIG. 2 shows an exploded perspective view of a particularly preferred construction of the piezo active material bender used in the integrated mechanism of the present invention.

A detailed description of a preferred construction of a tripping mechanism incorporating the piezo active material bender element will now be undertaken by way of example and with reference to FIGS. 2 and 3.

The tripping mechanism according to the preferred embodiment and shown in the accompanying drawings is constructed from a number of layers of sheet material. The relative thicknesses of the different layers are chosen having regard to the different functions to be performed by the layers and this also applies to the material utilised. For ease of handling in this particular construction, the material is metal strip in which the thickness is readily controlled to acceptable limits by the fabrication process. Thicknesses of 0.15 millimetres to 0.2 millimetres have been found to be suitable but other thicknesses can be used as can other materials for certain of the layers. It is not necessary for the layers to be metal or conductive and in fact, in some instances it may well be an advantage for the layers to be insulative or self lubricating by being manufactured from a suitable plastics material. However, where this preferred construction is used in the integrated actuator of the present invention, it is preferable that the alloys forming part of the active material bender, and/or of the other laminated layers be matched to the alloys of the bimetal strip, in order to cancel dimensional changes or flexing due to natural changes in ambient temperature.

The tripping mechanism according to the preferred embodiment of the present invention comprises a substrate 10 to which are attached a stack of other layers the stack comprising a frame 12, a spacer 14, and a planar bimorph layer 16 in that order from the substrate 10. A slider element 18 is further provided arranged to slide within a profiled channel 30 formed in the frame 12 and the slider is formed with an extension 32 which extends beyond the open end of the profiled channel 30 in the frame 12.

The slider 18 is formed with a slot 34 provided in the extension 32, the slot being arranged to receive a spring 36, with one end of the spring being located on a spring seat 37 provided with the slot, with the other end of the spring 36 in engagement with a spring seat 38 provided on one of the other layers, and in this case the spacer layer 14. The slider member is capable of being latched against the action of the spring 36 by means of a rotatable pawl 40. The pawl 40 is mounted for rotation by means of a bearing 41 provided in the preferred embodiment on the spacer 14 but which may also be provided on the substrate 10. The spacer is also further provided with an aperture 42 through which the operable, movable tip 44 of the piezo bimorph extends in order to control the rotation of the pawl 40 and thus the release or latching of the slider 18.

Before describing the operation of the above described mechanism, it is important to understand that the profiled channel 30 in the frame 12 is specially shaped so that the slider 18, although being largely movable linearly in the direction of the arrow X under the action of the spring 36 is also capable of slight lateral or rotational motion. Also, the profiled channel narrows near the open end 64 of the channel so as to restrict the stroke of the slider which is formed with protrusions 46 wider than the narrow open end of the channel 64. Also, the pawl 40 has a semi circular portion 48 arranged to be received in a corresponding portion 50 of the profile channel so as to be capable of angular movement in the direction of the arrow A (shown as clockwise within the drawing) within the profile channel. The pawl is further formed with a shaped recess 52 arranged to receive a correspondingly-shaped projection 54 on the end of the slider 18 remote from the spring 36. The shape and size of the meeting projection 54 and recess 52 are carefully designed to provide a specific burst force and the slider is also provided with an additional angled latching surface 56 arranged to slidably engage a corresponding angled latching surface 58 provided on the frame 12. The angles of the respective latching surfaces 56 and 58 are such that the force exerted by the spring 36 upon the slider 18 when the slider 18 is latched causes the latching surface 56 to press against the latching surface 58, the reaction force generated by the latching surface 58 causing a turning moment to be applied to the slider 18 in the direction of the arrow B, shown as anticlockwise on the drawing.

FIG. 3 illustrates a cross-section of the various layers when assembled. With reference to FIG. 3, it will be seen that the piezo-bimorph 16 is provided with a pin member 44 which extends through aperture 42 provided in the spacer to engage with the pawl 40. Typically, the pin member 44 corresponds to the depth of the spacer 14 and the slider 18, and this is typically 0.35 mm. The pin member 44 is provided on the operating end of the piezo-bimorph 16 such that when the piezo-bimorph 16 is actuated the pin member 44 is moved out of the plane of rotation of the pawl 40 in the direction of the arrow C to such an extent that the pawl 40 becomes free to rotate in the direction of the arrow A. Within FIG. 3 the pawl 40 is shown mounted on a bearing 41 (not shown) provided on the spacer 14, although it will also be possible to provide the bearing 41 on the substrate 10.

Turning now to the operation of the mechanism, let us assume that the various layers are all assembled, stacked one on top of the other as shown in FIG. 3, with the slider in position in the channel 30 such that the latching surface 56 is in engagement with the latching surface 58 on the frame 12 and the spring 36 is thus in compression between the spring seats 37 and 38. The surfaces 56 and 58 are angled such that the spring force is converted into a rotational force as indicated by the arrow B. This rotation is restricted by virtue of the projection 54 on the slider 18 being restrained by the recess 52 in the pawl 40. Movement of the pawl 40 in the direction of the arrow A is restricted by virtue of the pin member 44 provided on the moveable end of the piezo bimorph 16.

When the mechanism is to be actuated, an electrical signal is applied to the piezo bimorph 16 which causes the bimorph to flex in such a way that the pin 44 is pulled upwards, out of the plane of the paper in FIG. 2 and in the direction of the arrow C in FIG. 3, and out of an engagement with the pawl 40. The shape of the meeting surfaces of the projection 54 and recess 52 in combination with the shape of the meeting surfaces 56 and 58 under the action of the force exerted by the spring 36 causes the slider 18 to start to pivot in the direction of the arrow B which in turn forces the pawl 40 to rotate in the direction of the arrow A until such time as the pawl 40 releases the projection 54 which permits free movement of the slider 18 firstly in an arcuate direction in the direction of the arrow B and subsequently in the direction of the arrow X so that the extension 32 of the slider 18 can be used to activate a further mechanism or apparatus, such as the firing mechanism of the plunger 76.

In order to reset and relatch the mechanism, it is assumed that there is no electric signal applied to the bimorph 16 so that the pin 44 is in its down most position. By moving the slider 18 against the spring 36 in the direction opposite to the direction X, the spring 36 is compressed and the slider is moved past the latching projection 58 to permit the projection 54 on the end of the slider to be received in the recess 52 in the pawl. The pawl is resiliently biased by a slight spring force in a direction opposite to the direction of the arrow A so as to permit the projection 54 to be captured by the recess and the pin 44 to hold the capture position.

It will be apparent from the above description that the reaction force generated by the latching surfaces 56 and 58 due to the compression of the spring 36, the burst force of projection 53 and recess 52, and the return spring force of the pawl 40 must all be carefully balanced in order to achieve correct operation. More particularly, whilst it will be apparent to the skilled reader that a large degree of variations can be accommodated, it will be appreciated that the sum of the return spring force acting to return the pawl 40 to the latch position with the burst force generated by the angled surfaces of the recess 52 and projection 54 must be less than the reaction force generated by the angled latching surfaces 56 and 58 under the compression of the spring 36 in order for the slider 18 to be released when the piezo-bimorph member 16 is actuated. If this condition is not adhered to, then the reaction force of the latching surfaces 56 and 58 will not overcome the burst force of the recess projection and the return force on the pawl, and the slider will not release.

Due to the small engagement depth and release force, it is possible to exploit the large motion of the planar bimorph to create a system which operates from a low power.

It will be appreciated that the above construction is capable of being manufactured to any dimensions. In fact, it is very suitable for micro-machining techniques due to the laminar nature of the structure.

A preferred drive circuit used to detect the second fault condition relating to current imbalances in the live and neutral lines, and to generate a corresponding drive signal for the active material bender will now be described with reference to FIG. 5.

Figure 5:
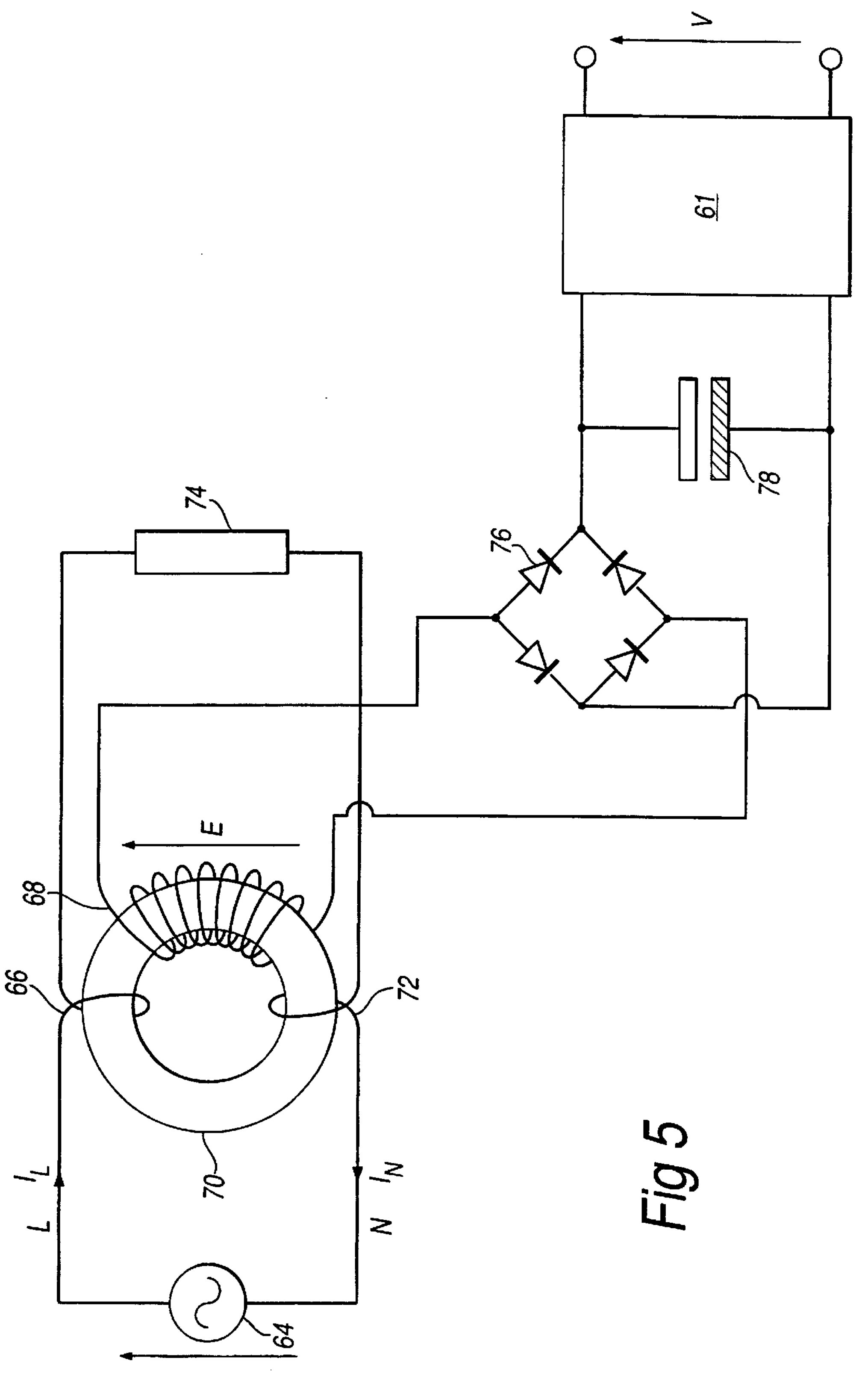
FIG. 5 shows a preferred drive circuit to be used with the preferred active material bender of the present invention.

In FIG. 5, the drive circuit for the active material bender comprises the toroidal transformer 70 mentioned earlier, the transformer having a first primary coil 66 arranged to carry a load current $i_1$ from the live contact of a voltage source 64 such as, for example, the mains, to a load 74. As will be apparent from the earlier description, in the preferred embodiment the current from the mains is first passed through the switching means 80, and then through the bimetallic strip 82 prior to being fed to the toroidal transformer. The first primary coil 66 consists of a single turn around the toroidal coil of the transformer 70. A second primary coil 72 is further provided consisting of a single turn of the toroidal coil, arranged to carry a current $i_n$ from the load 74 back to the neutral contact of the voltage source 64, and preferably via the switching means 80, although this need not necessarily be the case.

In addition to the first and second primary coils, a secondary coil 68 comprising a plurality of turns is further provided on the core of the toroidal transformer 70, an induced output voltage E across the secondary coil 68 being fed to a diode bridge rectifier 76 for rectification, the rectified output drive voltage from the secondary coil 68 then being passed to a voltage multiplier 61 for voltage multiplication of the output drive voltage E to an operating voltage V. In the preferred drive circuit, a smoothing capacitor 78 is further provided connected across the output of the diode bridge rectifier 76 in order to smooth the rectified voltage prior to multiplication in the voltage multiplier 61.

The voltage multiplier 61 may be any convenient multiplication means or circuit elements as will be apparent to the man skilled in the art.

Although within the preferred drive circuit described above and shown in FIG. 5 the output drive voltage E from the secondary coil is shown as being rectified by the diode bridge rectifier 76 prior to multiplication in the multiplier 61, this order is not essential to the operation of the present invention, and it may of course be possible that the order of the rectifier 76 and the multiplier 61 be reversed, in that the AC voltage spikes output from secondary coil may be multiplied by the multiplier 61 prior to rectification by the bridge rectifier 76.

The drive circuit as described above operates as one of the sensing means in the present invention to detect the second fault condition, being a current imbalance, and in particular the provision of the transformer allows for accurate current imbalance sensing, as will be explained more fully below. Preferably, the primary coils 66 and 72 comprise only a single turn, while the secondary coil 68 has a large number of turns, and typically more than 1000. High permeability materials such as Nickel Iron are used to increase the overall inductance of the system.

The drive circuit of the active material bender having the aforementioned construction operates in the following manner. The voltage created across the secondary coil 74 of the toroidal transformer 70 is the back-EMF to oppose any change in the currents flowing in either of the primary coils, and is given by the well known equation $E=-Ldi/dt$. Under normal circumstances i.e. in the absence of a fault condition, the respective electric currents flowing in the live coil 66 ($I_1$) and the neutral coil 72 ($I_N$) are equal and opposite, so the magnetic fields associated with the respective currents cancel out, and thus there is little or no current induced in the secondary coil 68.

If a proportion of the incoming current $I_1$ begins to flow out of the load due to a fault condition such as, for example, a short circuit or a human in danger of electrocution, the magnetic fields associated with the respective currents flowing through the two primary coils cease to be equal and opposite, resulting in an induced voltage in the secondary coil 68. Initially, the induced waveform is sinusoidal with the same frequency and phase as the voltage supply 64 to match the fault current, but as the fault current increases the toroidal transformer is arranged to saturate and the output voltage waveform E across the secondary coil 74 becomes spiked. In traditional electro-mechanical relays this is a disadvantage, because the power delivered decreases. Piezo electric and electrostrictive materials however are distinctive in requiring very low power but being demanding of a high electric field in order to operate. As mentioned above, the voltage output of an inductor is calculated by the equation $E=-L\,di/dt$, where E is the Voltage, L is the system inductance and di/dt is the rate of change of current over time. The saturation of the magnetic core results in a very high di/dt and so the voltage across the secondary coil goes up. The drive circuit used in the preferred embodiment of the present invention utilizes this behaviour in order to generate an initially high voltage from the toroidal transformer. Preferably, the magnetic core of the transformer is designed to saturate at a point around 50% of the trip value, being the level of current imbalance between the two primary coils indicative of a fault condition.

In the drive circuit shown in FIG. 5, the induced voltage waveform E across the secondary coil is preferably rectified in a bridge diode circuit 76, and smoothed with a smoothing capacitor 78. The thus rectified and smoothed signal is then fed to a voltage multiplier circuit 61 for multiplication by a convenient factor such as two or three up to an operating level V. The output signal V is then used to drive the active material bender.

As an alternative drive circuit, an oscillator circuit and appropriate control chip may be further provided arranged to control the switching of the current through the secondary coil on the transformer. Such operation is similar to that of a switched mode power supply, where the sudden switching off of the current in an inductor is used to create a high voltage pulse, where the timing of the disconnection is governed by the voltage across a reference resistor. If such switching is undertaken very rapidly using the oscillator circuit, then high voltages can be created. By controlling the frequency and duty cycle of the oscillator then the necessary operating voltages can be obtained from the toroidal transformer. In order to achieve a suitable voltage it is also necessary to rectify the toroid output and the also rectify the output from the drive chip. This is done using a diode bridge rectifier in both cases.

Figure 4:
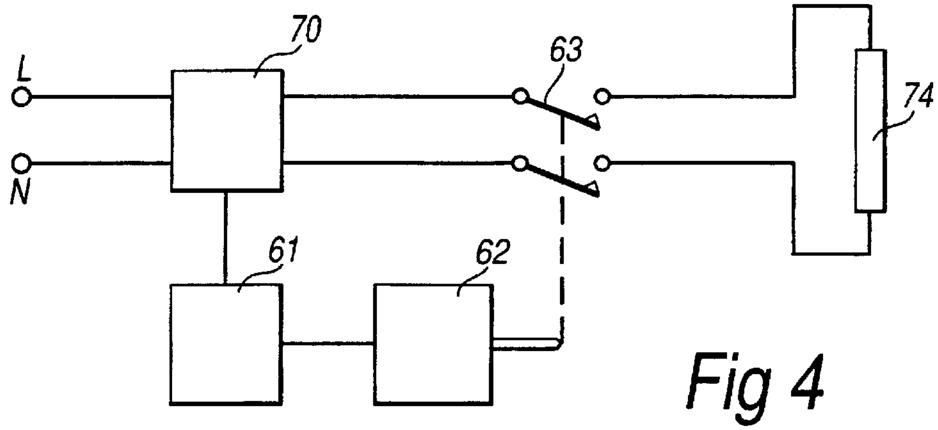
FIG. 4 shows a block diagram of the integration of the active material bender mechanism with a mechanism for opening electrical contacts used in the present invention.

FIG. 4 shows a block diagram illustrating how the drive circuit and the tripping mechanism incorporating the active material bender may be integrated together. More particularly, with reference to FIG. 4, a pair of contact switches 63 are provided in the live circuit between the toroidal transformer 70 and the load 74 arranged to break the live circuit and thus prevent current flowing through the coils of the toroidal transformer 70. The contacts 63 are mechanically linked to the tripping mechanism incorporating the active material bender labelled 62 in the diagram. More specifically, preferably the contacts 63 are mechanically linked to the extension 32 of the slider 18 of the electrical switching mechanism and arranged so that the electrical contacts 63 are opened when the slider 18 is released from its latched position within the profiled channel 30 such that the extension 32 projects a substantial amount beyond the end of the channel 30. The contacts 63 may be directly mounted upon the extension 32 of the slider 18, or a mechanical linkage or further mechanism may be provided between the slider 18 and the electrical contacts 63.

Preferably, the electrical contacts 63 are the same contacts as those contacts 94 opened by the plunger mechanism, in which case a mechanical linkage or further mechanism is provided between the slider 18 and the firing mechanism of the plunger 92, arranged to operate such that the plunger is fired to open the contacts 94 when the slider is released from within the profiled channel 30.

In operation, therefore, assuming the electrical contacts 63 (94) are closed and current is flowing through the load 74, the toroidal transformer 70 acts to detect any current imbalances between the current $i_1$ and $i_n$ flowing in the respective live and neutral lines by virtue of outputting the output drive voltage E being the back EMF across the secondary coil, this back EMF is then rectified if required and fed to the voltage multiplier 61 for multiplication up to the operating voltage V, the operating voltage V being arranged to be placed across the piezo-bimorph of bender 16 as appropriate in order to actuate the piezo-bimorph 16 to bend out of the plane of action of the pawl 40 thus releasing the slider 18 from the profiled channel 40, thus firing the plunger 92 to open the contacts.

The operation of the bimetallic strip in detecting low-current fault conditions will now be explained in more detail.

As mentioned previously, the actuator 84 of the bimetallic strip 82 acts to press upon the active material bender in the presence of a low-current fault condition. As will now be understood from the description of the tripping mechanism of FIG. 2 given above, preferably the actuator 84 of the strip 82 is arranged to move the piezo bimorph 16 of the tripping mechanism out of the plane of action of the pawl 40, thus releasing the slider 18 from the channel 30. As explained above, the release of the slider 18 from the channel preferably causes the plunger to fire, thus breaking the circuit. The tripping mechanism of FIG. 2 can therefore be caused to release by either the bimetallic strip detecting a low current fault condition, or the active material bender and associated drive circuit detecting a current imbalance. This has the advantage that the same tripping mechanism can be effectively used to detect and act upon two different types of current-driven fault.

As will be apparent from the foregoing, the present invention therefore presents an integrated actuator which may be used to detect multiple electrical fault conditions, and which combines at least three different detection mechanisms into an integrated mechanism.

What is claimed is:

1. An integrated electrically actuable mechanical release mechanism comprising:

first fault detection means arranged to detect a first fault condition in an electric circuit;

second fault detection means arranged to detect a second fault condition in the electrical circuit;

third fault detection means arranged to detect a third fault condition in the electrical circuit; and means for breaking the electrical circuit in response to detection of any of the first, second or third fault conditions, wherein said first, second and third fault detection means are line independent and the first fault detection means comprises a bimetallic strip arranged to bend in response to the occurrence of the first fault condition in the electrical circuit.

2. A mechanism according to claim 1, wherein said first fault condition is a low-fault current condition.

3. A mechanism according to claim 1, wherein said second fault condition is a current imbalance between two or more parts of the electrical circuit.

4. A mechanism according to claim 1, wherein said third fault condition is a gross over-current condition.

5. A mechanism according to claim 1, wherein the bimetallic strip is further provided with an actuator, the actuator being arranged to act upon the second fault detection means to cause the second fault detection means to indicate a fault.

6. A mechanism according to claim 1, wherein the second fault detection means comprises an active material bender arranged to bend in response to the occurrence of the second fault condition in the electrical circuit.

7. A mechanism according to claim 6, wherein the second fault detection means further comprises a drive circuit for the active material bender, the circuit comprising a toroidal transformer and voltage multiplier means.

8. A mechanism according to claim 7, wherein the transformer has a first primary coil and a second primary coil, and a secondary coil arranged to provide an output drive voltage in response to any current imbalance between electric currents flowing in the first and second primary coils, respectively, the transformer being further arranged to saturate at a level of current imbalance less than a level indicative of the second fault condition.

9. A mechanism according to claim 8, wherein the transformer is arranged to saturate at 50% of the current imbalance level indicative of the second fault condition.

10. A mechanism according to claim 7, wherein the drive circuit further comprises voltage rectifying means arranged to rectify output drive voltage.

11. A mechanism according to claim 6, wherein the active material bender is incorporated within a tripping mechanism, the tripping mechanism comprising a planar frame member provided with a profiled channel, a planar slide member arranged to be received within the profiled channel and latching means arranged to latch the planar slide member within the profiled channel, the latching means being responsive to the active material bender to latch or release the slide member to close or open at least one electrical contact.

12. A mechanism according to claim 11, wherein the active material bender is laminated to said planar frame member.

13. A mechanism according to claim 11, wherein the active material bender is further arranged to move out of the plane of action of the latching means upon actuation.

14. A mechanism according to claim 11, further comprising:

a planar spacer member laminated between said active material bender and said planar frame member.

15. A mechanism according to claim 11, wherein said latching means comprises a rotatable pawl arranged to latch the slide member when held in a first position by the active material bender.

16. A mechanism according to claim 15, wherein said rotatable pawl is further provided with a shaped recess arranged to receive a correspondingly shaped projection provided on the slide member and wherein in a latched mode of operation said rotatable pawl is prevented from rotation by said active material bender such that said shaped projection is held within said shaped recess to latch said slide member, and in a released mode of operation the active material bender moves to allow said rotatable pawl to rotate, thereby freeing said shaped projection from said shaped recess to release said slide member.

17. A mechanism according to claim 11, wherein said profiled channel is provided with a first angled latching surface and the slide member is provided with a second angled latching surface, the arrangement being such that said second angled latching surface is held in slidable meeting engagement with said first angled latching surface when said slide member is latched.

18. A mechanism according to claim 11, further comprising:

spring means arranged to bias said slide member out of said profiled channel.

19. A mechanism according to claim 1, wherein said third fault detection means comprises a coil arranged around a core, the arrangement being such that the core is ejected from within the coil upon the occurrence of the third fault condition.

20. A mechanism according to claim 1, wherein said means for breaking the electrical circuit comprises a plunger arranged to open electrical contacts provided in the electrical circuit upon detection of a fault condition.

21. An integrated electrically actuable mechanical release mechanism comprising:

a first fault detector arranged to detect a first fault condition in an electric circuit;

a second fault detector arranged to detect a second fault condition in the electrical circuit;

a third fault detector arranged to detect a third fault condition in the electrical circuit; and a unit configured to break the electrical circuit in response to detection of any of the first, second or third fault conditions, wherein said first, second and third fault detectors are line independent and the first fault detector comprises a bimetallic strip arranged to bend in response to the occurrence of the first fault condition in the electrical circuit.

* * * * *